(No Model.)
A. J. CURTIS.
MACHINE FOR MAKING DOWELS.
No. 358,965. Patented Mar. 8, 1887.
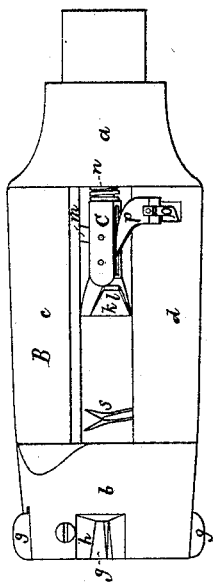
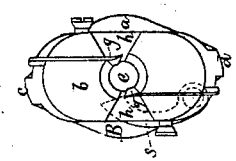
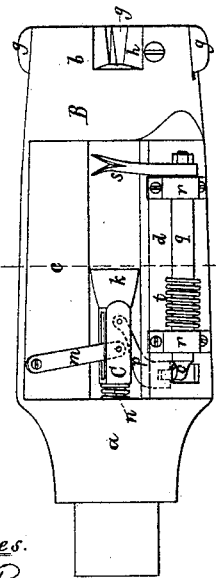
Fig. 8.
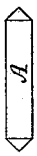
Fig. 1.
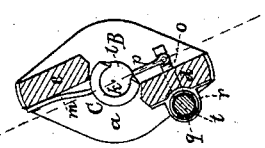
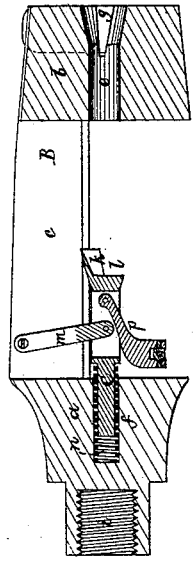
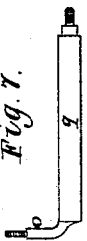
Fig. 7.
Witnesses.
S. N. Piper
H. B. Torrey
Inventor.
Andrew J. Curtis
by R. H. Eddy atty

UNITED STATES PATENT OFFICE.

ANDREW JACKSON CURTIS, OF MONROE, MAINE.

MACHINE FOR MAKING DOWELS.

SPECIFICATION forming part of Letters Patent No. 358,965, dated March 8, 1887.

Application filed November 17, 1886. Serial No. 219,124. (No model.)

*To all whom it may concern:*

Be it known that I, ANDREW JACKSON CURTIS, of Monroe, in the county of Waldo, of the State of Maine, have invented a new and useful Improvement in Machines for Making Dowels; and I do hereby declare the same to be described in the following specification, and represented in the accompanying drawings, of which—

Figure 1 is a side view of a dowel of the kind made by the machine of my invention, the nature of which is defined in the claim hereinafter presented. Fig. 2 is a front side view, Fig. 3 a rear side view, Fig. 4 a front end view, Fig. 5 a longitudinal and axial section, and Fig. 6 a transverse and median section, of such machine. Fig. 7 is a top view of the rock-shaft $q$ and its curved arm $o$, hereinafter described. Fig. 8 is an inner end view of the furcated arm or cutter $s$.

The dowel shown at A in Fig. 1 has each end conical, and between the ends it is cylindrical. In Figs. 2, 3, 4, and 5, B is the rotary cutter-stock, which is composed of two heads, $a$ and $b$, and two bars, $c$ and $d$, extending between and uniting such heads, all being arranged as represented. Each head has in it axially a cylindrical bore, that of the anterior head, $b$, being shown at $e$, and that of the rear or posterior head, $a$, at $f$. Furthermore, there are arranged and fixed in the forward head and to extend into its bore two or other suitable number of chisels or cutters, $g$, having to each and in the head a chip or shaving discharging-throat, $h$. In the other or rear head (which has in it or to it a female screw, $i$, or other suitable means of attaching it to the arbor of a lathe) there is a slide-piece, C, which has in it at its front end a socket, $k$, in the form of a conic frustum, such socket being open on one side, as shown at $l$. The said slide-piece is supported by a pendulous link, $m$, pivoted to it and to the bar $c$, and there is within the bore of the head $a$, and properly applied to it and the slide-piece, a spiral spring, $n$, for advancing the slide-piece.

Within and extending down from the slide-piece and pivoted to it is a pitman or push-link, $p$, which at its lower end is jointed to a curved arm, $o$, extending through the bar $d$ and from a rock-shaft, $q$, supported in bearings $r$, fastened to the said arm. There is secured to the said rock-shaft at its front end a furcated arm or cutter, $s$, and there surrounds the shaft a spiral spring, $t$, one end of which is fixed to the shaft and the other to its rear box or bearing.

If we suppose the machine to be attached to the arbor of a lathe, or to any other suitable shaft provided with means of rapidly revolving it, and that such machine has extending around it a suitable chip-guard or bonnet-tube having an opening in its bottom to allow of the escape of the dowels out of it, and also that there is connected with such tube a fan-blower or means of blowing away from it chips as they may fall or gather therein, the machine will be in a condition for use, though it may be used without such a bonnet being applied to it.

The dowels are made from a long stick, prismatic or otherwise formed. While the machine is in revolution, the stick held firmly from revolving by pinchers is to be inserted endwise into the mouth of the machine and pressed forward into the bore of the head $b$, the cutters of which as the stick may be advanced through the bore of such head will reduce the stick to a cylindrical form. On the stick entering the conical recess in the slide-piece and being borne against the bottom thereof, the slide-piece will be forced backward, and in retreating, its pitman or link $p$, by its action on the curved arm $o$, will cause the rock-shaft to be revolved or turned in its bearings in a manner to force its furcated cutter down upon the stick, whereby as the stick may be held from revolving and the machine revolves on the stick a dowel will be severed from such stick, each dowel, except the first one to be removed, being tapered at each end of it, as represented, after which it will fall into and out of the bonnet, provided the machine be bonneted as explained.

I do not herein claim a dowel with conical ends, as shown, though not claimed, in the United States Patent No. 331,733, for making bed-pins with heads; nor do I claim a machine as shown in the United States Patent No. 15,763, dated September 23, 1856, which, though in some respects analogous to my dowel-making machine, differs therefrom materially in others. It has a cutter carried by a lever, such cutter being simply to finish or make convex on its edge the head made by the cutter at the mouth of the machine, whereas in my machine the furcated cutter *s* performs a very different duty, viz., of cutting a groove on the stock in a manner to form the dowels with conical ends. Furthermore, the cutter-stock in my machine is open laterally to discharge the dowels, whereas such is not the case with the bed-pin-making machine shown in said patent No. 15,763. In consequence of such cutter-stock being so open, the slide-piece has to be supported by the pendulous link *m*, and the rock-shaft, with its connections with the slide-piece C, becomes necessary, none of which are found in the bed-pin-forming machine.

I claim—

The combination of the tubular stock composed of the two heads and their connecting-bars and provided with end cutters and chip-discharging mouths arranged in the front head, as represented, with the recessed slide-piece, its supporting-link, advancing-spring, and pitman, and with the rock-shaft provided with the curved arm extending from it and jointed to such pitman, and also having the retracting-spring and furcated cutter, all being arranged and to operate essentially as set forth.

ANDREW JACKSON CURTIS.

Witnesses:
E. BOARDMAN,
N. F. HANEY.